(12) United States Patent
Comeras et al.

(10) Patent No.: US 8,295,179 B2
(45) Date of Patent: Oct. 23, 2012

(54) METHOD AND SYSTEM FOR MEASURING QUALITY OF NETWORKING NODES

(75) Inventors: Marc Portoles Comeras, Barcelona (ES); Andrey Krendzel, Barcelona (ES); Josep Mangues Bafalluy, Barcelona (ES)

(73) Assignee: Fundacio Privada Centre Tecnologic de Telecomunicacions de Catalunya, Castelldefels (Barcelona) (ES)

( * ) Notice: Subject to any disclaimer, the term of this patent is extended or adjusted under 35 U.S.C. 154(b) by 426 days.

(21) Appl. No.: 12/595,291

(22) PCT Filed: Apr. 16, 2007

(86) PCT No.: PCT/EP2007/053660
§ 371 (c)(1),
(2), (4) Date: Dec. 1, 2009

(87) PCT Pub. No.: WO2008/125146
PCT Pub. Date: Oct. 23, 2008

(65) Prior Publication Data
US 2010/0142375 A1    Jun. 10, 2010

(30) Foreign Application Priority Data
Apr. 13, 2007  (ES) .................................. 200700995

(51) Int. Cl.
*H04J 1/16* (2006.01)
(52) U.S. Cl. ....................................... 370/235; 370/229
(58) Field of Classification Search .................. 370/229, 370/230, 230.1, 231, 232, 233, 234, 235, 370/252, 338, 400, 401, 402, 430, 442, 443, 370/445, 437, 465, 473, 910; 455/522; 709/253; 710/107, 240
See application file for complete search history.

(56) References Cited

U.S. PATENT DOCUMENTS

| 6,252,881 | B1 * | 6/2001 | Samoylenko | 370/433 |
|---|---|---|---|---|
| 6,347,091 | B1 * | 2/2002 | Wallentin et al. | 370/437 |
| 7,180,858 | B1 * | 2/2007 | Roy et al. | 370/232 |
| 7,492,710 | B2 * | 2/2009 | Wadekar et al. | 370/230 |
| 2006/0128414 | A1 * | 6/2006 | Shida et al. | 455/522 |
| 2006/0176896 | A1 * | 8/2006 | Callaway et al. | 370/437 |
| 2006/0176908 | A1 * | 8/2006 | Kwon et al. | 370/473 |
| 2006/0187852 | A1 * | 8/2006 | Kwon et al. | 370/252 |
| 2007/0217449 | A1 * | 9/2007 | Guzikevits | 370/468 |

(Continued)

OTHER PUBLICATIONS

International Search Report dated Apr. 24, 2008, from the corresponding International Application.

(Continued)

*Primary Examiner* — Abdullah Riyami
(74) *Attorney, Agent, or Firm* — Katten Muchin Rosenman LLP

(57) ABSTRACT

This method is applied to nodes of networks based on carrier sense measurements and defines as well as determines accurately the values of two quality metrics to characterize respectively the accuracy of a node in carrier sensing and the ability of said node to cope with a given workload of concurrent incoming and outgoing communication traffic. These two quality metrics characterizes the intrinsic losses of a node due to different hardware and software limitations, which generate unexpected traffic losses in the node and make experimentally obtained results not match with those obtained through theoretical models. A testing controlled scenario is provided for allowing to measure the values of the two quality metrics separately, detecting the presence of the maximum value measured for concurrent workload of the node under test in the measurement of the accuracy of said node in carrier sensing.

10 Claims, 8 Drawing Sheets

U.S. PATENT DOCUMENTS

2008/0253327 A1* 10/2008 Kohvakka et al. ............ 370/330

OTHER PUBLICATIONS

Marc Portoles-Comeras, et al. "Monitoring wireless networks: performance assessment of sniffer architectures" Proceedings of the IEEE Conference on Communications (ICC 2006), Jun. 2006.

Marc Portoles Comeras, et al. "Multi-radio based active and passive wireless network measurements" Proceedings of WINMEE 2006, Apr. 3, 2006.

* cited by examiner

METHOD AND SYSTEM FOR MEASURING QUALITY OF NETWORKING NODES

FIELD OF THE INVENTION

The present invention relates generally to the field of telecommunications networks and preferably can be applied to wireless networking communications.

More precisely, this invention allows to obtain a characterization of the quality of a certain node and an assessment of its suitability to a planned deployment, prior to the use of said node in a real network scenario, wherein the node performs channel measurements (carrier sensing) to access a shared physical medium (such as an electrical bus, or a band of electromagnetic spectrum). Thus, the present invention is useful to aid manufacturing, configuration and calibration processes for network deployment.

STATE OF THE ART

In Multiple Access Networks, wherein pluralities of nodes send and receive on the medium, carrier sensing is performed by measuring the interference level in a selected channel. Carrier sense refers to the fact that a transmitter listens for a carrier wave before attempting to send, that is, the transmitter searches to detect the presence of transmissions from another station before its trial to transmit and, if a carrier is sensed, the node waits for the transmission in progress to finish before initiating its own transmission. Multiple Access Networks refers here to carrier sensing based networks.

Many diverse techniques for Multiple Access are widely known: CSMA, FDMA, TDMA, CDMA, etc., to name but a few.

In particular, for wireless communications, the current trends in the research, standardization and end-user communities push the development and deployment of the wireless networks that employ a distributed control mechanism for accessing the medium. In this type of networks, there is no centralized agent that regulates medium access of the wireless terminals (as such a centralized agent exists in traditional cellular networks) but, instead, the access control is shared among terminals in a distributed manner. Commonly, mobile terminals monitor channel activity before transmitting information in order to decide the most appropriate instant to transmit data. State-of-art wireless networking solutions make use of this type of techniques. This is mostly due to the impact of the standardized IEEE 802.11 WLAN protocol, the widespread availability of commercial products that follow this Standard, and the possibility to easily set up wireless (infrastructure or ad hoc) networks using these products and similar ones.

The medium access technique used by these wireless networking solutions also relies on carrier sense measurements of the shared wireless medium that is going to be shared to communicate. Mobile terminals get energy measurements in order to detect other communications that could eventually harm their own ones. Based on these measurements, these terminals take the decision to either start or defer transmissions. The most appropriate way that these measurements must be conducted is still not a clear issue and is left, in most part, up to the wireless node manufacturer. Several solutions exist in the market and some manufacturers even permit some adjustments on the carrier sensing process, leaving to the network administrator or even the end user, the configuration of the process.

But there are a number of issues related to the architecture of a wireless node which may affect its capacity to correctly detect other transmissions in a shared wireless medium.

Note that different hardware and software solutions for building up the nodes to carry communications (node architectures) are being used to deploy wireless networks all around. There exist wireless networks that rely on base stations or access points that serve as the point of attachment for wireless terminals to access a backhaul (generally based on fixed cabled communications) in single-hop wireless communications. There are also other types of networks where several wireless nodes may collaborate in forwarding information over multiple wireless hops. Multi-hop networks are collections of wireless mobile computing nodes dynamically forming a temporary network without the use of any existing network infrastructure or centralized administration. As network size grows, communication between two nodes may go through multiple wireless links, or through multiple "hops" for one node to exchange data with another node across the wireless network. Multi-hop networks include packet-radio networks, ad-hoc networks and sensor networks.

Once the wireless node gets its final configuration and all hardware and software elements are integrated, there may appear some factors that also affect carrier sense and detection of transmissions from other nodes in the network, which is a task mainly carried out by the radio-frequency module of the node. The correct detection of other transmissions can be interfered by, among other factors: unexpected interactions between components of the node, specific code implementations that make use of energy measurements to take decisions, or in case that an antenna is used even the shape of its radiation pattern.

However, there is a lack of performance or quality metrics and assessment techniques to aid in the configuration and calibration of wireless nodes that make use of distributed control mechanisms for multiple access. Even more, service providers and network administrators that use wireless nodes in their network deployments but do not generally participate in their manufacturing process, require tools and methodologies to assess the quality of the products acquired before using them in production networks. The robustness and stability of these networks strongly depends on the correct performance and functionality of the nodes used.

As an illustrative example, FIG. 1 shows a typical wireless multi-hop scenario, where a certain node (A) is forwarding to a neighbouring destination node (D) the information that comes from other nodes (N1, N2): flow 1 ($F_{N1}$) and flow 2 ($F_{N2}$) respectively. In addition, this node (A) can also be adding information flow generated by itself ($F_A$) to the data forwarded. Thus, the destination node (D) receives flows 1 and 2, and the information generated in node A. This is a classic forwarding scenario but challenged by the fact that all transmissions share the same medium and have to compete for channel access. All communications are wireless and nodes (A, N1, N2, D) use a distributed access control mechanism based on detecting the activity of other nodes to choose the appropriate instant to transmit data.

In this typical scenario such as the one illustrated in FIG. 1, there can be found three types of data loss sources:
i) There are losses induced by the communication protocol itself. Depending on the access technology used, there exists a probability that two or more wireless nodes choose the same instant to send information, which results in a collision and the consequent loss of data.
ii) There are losses resulting from the specific location of nodes and the characteristics of the wireless channel.

Propagation losses and those induced by the hidden terminal effect fall within this group.

iii) There are losses intrinsic to the wireless node design. Hardware and software design and configuration options may cause additional undesirable losses during the communication process. The maximum workload that the node can handle and the ability of the node to detect other harmful transmissions are two important factors that determine the amount of these losses.

Protocol and location dependent factors (i and ii issues) are usually considered when modelling the behaviour of wireless networks. On the contrary, this is not the case with issues related to manufacturing and configuration processes, which are generally considered as behaving ideally. Even more, no general framework has been considered, so far, in order to model such behaviour so that node performance can be assessed prior to network deployment. As a consequence, unexpected losses are prone to arise when deploying wireless multi-hop networks with nodes that have not been correctly assessed with respect of the ideally expected behaviour.

There are two main issues that may lead to the same effect (i.e. information loss) at the node A in FIG. 1. On one side, there is the accuracy of the carrier sensing mechanism to reliably detect other flows that are sent in the same channel by close nodes. Protocols based on the carrier sensing mechanism highly rely on the appropriate tuning of energy measurements at the hardware level. If incorrectly tuned, measurement inaccuracies can highly increase the amount of unexpected collisions due to an over-utilization of the channel. On the other side, even when carrier sensing measurements are performed correctly, the wireless node might not be able to support the amount of traffic that it has to concurrently send and receive at the same time. This might be determined by diverse parameters such as interrupt handling at the node, device memory or driver performance. When the node happens to be handling more information that it can cope with, it will start dropping data resulting in additional information loss. Besides, since the wireless node A can be generating data at the same time it is forwarding data from other nodes, a forwarding rate measurement is not enough to account for this. Instead, it should be assessed by the amount of traffic that a node can concurrently be receiving and generating.

It is worth noting here that when unexpected losses are detected in such scenario, it is difficult to determine whether they were caused by an inaccurate carrier sensing mechanism or by the wireless node inability to cope with the whole workload.

Moving from an analytical to a practical approach, when designing and deploying telecommunications networks that are based on distributed medium access mechanisms, there is still need for a correct high level characterization of the hardware and software dynamics of the nodes to be used.

SUMMARY OF THE INVENTION

It is therefore an object of the invention to characterize the actual behaviour and performance of the nodes to be used in multiple access networks, so that this characterization can be later used to detect and correct deviations of experimental results from the theoretically expected ones.

It is further another object of the invention to characterize the quality of said network nodes with respect to the hardware and software elements used to build them.

Another object of the invention is to define and determine the values of two quality metrics to characterize respectively the accuracy of a node in carrier sensing and the ability of said node to cope with a given workload of concurrent incoming and outgoing communication traffic.

It is also another object of the invention to provide a testing framework and a systematic methodology for measuring separately the value of the two quality metrics above outlined.

The present invention helps to design and analyze network deployments and more particularly is applicable to nodes for wireless multi-hop networks.

For these goals, the present invention proposes the adoption of two independent parameters that constitute quality metrics to characterize respectively:

1) the (in)accuracy of a network node to conduct carrier sense measurements, this parameter can be called "sense_accuracy" from now on;
   and
2) the capacity of a network node to handle both incoming and outgoing traffic concurrently, this parameter can be called "max_concurrent_rate" from now on.

This invention proposes how to obtain experimentally the values of these two parameters. By measuring "sense_accuracy", the invention serves the purpose of characterizing the ability of any network node to detect neighbouring transmissions from other nodes sharing the communication medium of the network. Additionally, for an accurate measuring of "sense_accuracy", the invention uses a characterization of the maximum workload that the node is able to sustain, i.e., "max_concurrent_rate", in order to validate the result of "sense_accuracy" obtained and correct it if necessary.

In this way, the intrinsic losses of a node due to different hardware and software limitations, which generate the same observed effect (i.e. unexpected traffic losses) in the node and make experimentally obtained results not match with those obtained through theoretical models, can be separated.

The "sense_accuracy" parameter represents the accuracy of a node to sense the medium busy when another node is sending information, and it is defined as:

$$\text{sense\_accuracy} = 1 - \begin{bmatrix} \text{the probability of the node} \\ \text{to sense medium idle when the} \\ \text{medium is being used} \end{bmatrix}$$

The "sense_accuracy" parameter can have a value between 0 and 1.

On the other hand, the "max_concurrent_rate" parameter accounts for the maximum rate of data that the node (under performance characterization or test) is able to reliably handle (i.e. without packet losses) when it is concurrently sending and receiving information. Reliability in this definition of "max_concurrent_rate" denotes that an experimenter can be confident that observed losses in the tested node are not attributable to limitations in the processing capacity of the node and are due to other causes, such as physical layer or data link layer (MAC: Medium Access Control) protocol issues.

In any node that implements a distributed medium access technique relying on detecting transmissions from other nodes (for example, a node supporting the IEEE 802.11 WLAN protocol), the process of transmitting data can be divided into three states: the idle state, the active state and the stall state.

Firstly, the idle state accounts for the time spent by the node in actions that do not imply occupying the wireless medium but that do require that this node is not detecting a transmission in the medium. This includes the time that the node is waiting random periods of time (such as the backoff counter in the IEEE 802.11 WLAN protocol) or waiting for guard times to conduct correct measurements of the medium (such as DIFS in IEEE 802.11).

Secondly, the active state accounts for the time that the node is actually sending data.

Thirdly, the stall state accounts for the time that the node detects other transmissions on the shared channel and defers any other action for a latter time. The stall state accounts for that time that the node either senses the medium as not suitable for transmission (i.e., the channel is busy) or when the node is actually receiving information for itself.

Considering these three possible states, the total data rate of information that a node when it is backlogged (i.e., while being in a saturated environment) can send (here called data_sent$_{STA}$) can be expressed as:

$$d = \text{data\_sent}_{STA} = L \cdot \frac{1}{T_{idle} + T_{active} + T_{stall}} \quad \text{(equation 1)}$$

In equation 1, L is the length (in bits) of the data packets sent, d is the value of data_sent$_{STA}$ expressed in bits per second (or packets per second making L=1), and $T_{idle}$, $T_{active}$ and $T_{stall}$ stand for the mean time that the node remains in idle, active and stall states, respectively, when sending a packet.

Given a packet length L, $T_{idle}$ and $T_{active}$ can be easily determined using the specifications of the protocol for distributed access that the wireless node is using to communicate. However, $T_{stall}$ highly depends on the scenario where the node is working and account for the complex interaction between all nodes present in a specific scenario, so its computation is, generally, very complex.

The present invention introduces a simple highly controlled environment, setup for testing a practical node, where $T_{expected\_stall}$ can be easily determined, defining $T_{expected\_stall}$ as the mean time that the node is expected to remain in stall state, that is, if the node is accurate at conducting carrier sense measurements.

When the carrier sensing mechanism is not accurate, that is, the node may fall in detecting transmissions from other stations, the equation 1 can be then reformulated as:

$$d = \text{data\_sent}_{STA} = L \cdot \frac{1}{T_{idle} + T_{active} + \alpha \cdot T_{expected\_stall}} \quad \text{(equation 2)}$$

being α=sense_accuracy, 0≦α≦1.

It is worth recalling here that equations 1 and 2 refer to the amount of data sent, regardless of whether it is received or not. It is, then, not a measure of throughput but of data rate that the node puts on the medium when working in a saturated environment.

The controlled testing environment proposed by this invention allows to obtain the value of $T_{expected\_stall}$ in an immediate way and to measure data_sent$_{STA}$ by using commodity hardware and software tools, which can be easily found in the current market.

In this testing environment or scenario, the node under test (i.e., the one to be characterized by the here described quality metrics of "sense_accuracy" and "max_concurrent_rate") is connected to at least two testing nodes so that all the nodes sharing medium are able to carrier sense. At least two independent multicast packet flows are generated so that the node under test can receive one of the flows (first test flow) and transmit the other one (second test flow). Both flows are sent to multicast addresses. The purpose of this is simplifying the computation of $T_{expected\_stall}$ as neither acknowledgements nor retransmissions happen in multicast transmissions over the medium. By using two differentiated flows, the independence of transmission and reception processes in the node under test is assured (i.e., the second flow is not the result of forwarding the first flow).

The testing procedure implemented in the described environment consists in periodically and simultaneously increasing the transmitted packet rate of both test flows (given a fixed packet size) and gathering the rate of packets sent by the node under test (second test flow) and the rate of packets correctly received by this node (from first test flow). Recall here that both flows are identical and thus, the packet rate increases are done simultaneously. The process of increasing the packet rate continues periodically until saturation is reached. Measuring the data rate sent by the node under test at this point provides an estimation of the value of data_sent$_{STA}$.

In an ideal scenario without inaccuracies in carrier sensing, when one transmitter detects the medium as not being used, the other one detects it as well, so then both are in idle state at the same time. Whenever one of the transmitters is actually sending data (i.e. it is in active state), the other falls into stall state and vice versa.

Therefore, when all the nodes in the scenario are configured to transmit data at the same speed (using the same modulation), the protocol they use to communicate is fair (i.e. assures equal probability to transmit for all nodes) and the multicast flows generate enough data traffic to saturate the network (in IEEE 802.11 links, wireless nodes are backlogged at all times), such as the testing scenario here proposed, a highly controlled environment is setup where an accurate value of $T_{expected\_stall}$ can be determined. Indeed, in this testing environment, where two transmitters (following the same modulation) at most are active (one of the transmitters is the node under test) and both fall within carrier sensing range of each other, when any of them falls into stall state because it detects that the medium is being used by the other transmitter, the value of $T_{expected\_stall}$ is the same as the value of $T_{active}$, which is easy to be computed by applying the specification of the communication protocol used by the node under test, thanks to fairness of said protocol.

Once the value of $T_{expected\_stall}$ obtained in this way, and with the measured value of data_sent$_{STA}$, the "sense_accuracy" can be estimated by solving the following equation derived from equation 2:

$$\text{sense\_accuracy} = \alpha = \frac{\frac{L}{\text{data\_sent}_{STA}} - T_{active} - T_{idle}}{T_{expected\_stall}} \quad \text{(equation 3)}$$

However, this value of the "sense_accuracy" parameter has to be validated by detecting the presence of the "max_concurrent_rate" parameter in the measurement of data_sent$_{STA}$.

In fact, when the value of "max_concurrent_rate" is lower than the one expressed by equation 2, the node under test does not reach a reliable value for data_sent$_{STA}$ in the proposed testing scenario and measuring "sense_accuracy" cannot be done confidently by applying equation 3. When the value of "max_concurrent_rate" is not known a priori, this invention provides a method and system capable to detect when "max_concurrent_rate" goes under the value given by equation 2 and reconfigure the testing environment to reliably measure "sense_accuracy".

Notice in equation 2 that data_sent$_{STA}$ depends on both the length L of the packets sent and on T$_{active}$, which is related to the physical rate (modulation) at which the node is configured. Hence, obtaining a reliable measurement of "sense_accuracy" consist in appropriately adjusting the value of these two factors (L and T$_{active}$) so that "max_concurrent_rate" falls beyond the value of the expected data_sent$_{STA}$ and thus, it does not distort this measurement.

The "max_concurrent_rate" parameter is an indication of the maximum amount of incoming and outgoing data traffic that the node can handle per time unit. Its value depends on the computing resources and capabilities of the node and can be determined by diverse design parameters such as, for instance: interrupt handling at the node, device or system memory and driver performance. This quality metric, "max_concurrent_rate", is in fact a measure of the workload that the node is able to sustain in a demanding situation and does not only account for the forwarding rate capacity of the node but also the possibility that the node generates its own traffic (e.g., a wireless mesh node that both relays packets and gives access to users on another channel). In any case, the value of "max_concurrent_rate" is a lower bound for a pure forwarding rate measurement as it represents, in general, a situation of more traffic demand for the node.

Measuring "max_concurrent_rate" in the proposed testing environment consists in periodically increasing the amount of workload that the node under test handles until it starts dropping data unexpectedly. Since the test flows used in this controlled environments are both incoming and outgoing traffic flows independently generated, the forwarding rate capacity of the node under test and the possibility of generation of its own traffic are taken into account.

The "max_concurrent_rate" parameter determined to characterize a node can be measured in packets per second or bits per second. In case the node has limited capabilities in the number of transactions (packets) that it can handle per time unit, "max_concurrent_rate" is better measured in packets per second using the shortest packets possible (data_sent$_{STA}$ can be measured in these units normalizing equation 2 by L). In case the node has limited capabilities in the amount of memory (bits) that it can handle per time unit, "max_concurrent_rate" is better measured in bits per second using the longest packets the possible. The measuring of "sense_accuracy" in the proposed testing environment is accommodated to nodes whose limiting factor is either the number of transactions or the amount of memory to be handled per time.

For determining a correct value of "sense_accuracy" in the presence of "max_concurrent_rate", whenever the value of this latter parameter is lower than the value of data_sent$_{STA}$ calculated by equation 2, the following steps are performed in the testing environment:

Firstly, a step reconfiguration of the node under test choosing a different physical rate (modulation) and/or select a different packet length L of the packets used for the test flows. The appropriate values to choose for these factors are those that guarantee that the result from equation 2 is lower than the value measured for "max_concurrent_rate".

Secondly, the value of T$_{expected\_stall}$ is re-calculated performing the testing procedure with the reconfigured node (for the new chosen values of L or physical rate).

Finally, the same procedure is repeated to measure data_sent$_{STA}$ and "max_concurrent_rate", and obtain a new estimation of "sense_accuracy" by applying these two new measured values of data_sent$_{STA}$ and "max_concurrent_rate" in equation 3. This estimated value of "sense_accuracy" is in turn validated as explained before.

It is therefore an aspect of the present invention is a method for measuring quality of networking nodes, which comprises the steps of:
  setting a controlled environment where at least two independent multicast packet flows (a first flow and a second flow) are generated, having selected identical modulation rate and a certain packet length L, and where a node under test receives the first flow and sends the second flow at a packet rate;
  determining the values of T$_{idle}$ T$_{active}$ and T$_{expected\_stall}$ in the controlled environment setup;
  increasing periodically the packet rate until the controlled environment reaches a saturation point;
  measuring a data rate sent (data_sent$_{STA}$) by the node at the saturation point in the controlled environment;
  measuring a maximum data rate (β) sent and received concurrently by the node at the saturation point in the controlled environment;
  measuring a carrier sensing accuracy (α) of the node for the selected modulation rate and packet length L.

The measured maximum data rate ("max_concurrent_rate" or β) and the carrier sensing accuracy ("sense_accuracy" or α) represent deviations of the behaviour of the practical node under test from an ideal behaviour. Thus, this method allows to compare the theoretical expected behaviour of an ideal node in a controlled environment with that of the real one in the same real setup.

Measuring a carrier sensing accuracy (α) comprises the following steps:
  calculating an estimated value of carrier sensing accuracy (α) of the node following the equation 3, and
  validating the estimated value of carrier sensing accuracy (α) by detecting the maximum data rate (β) present in said step of "sense_accuracy" estimation.

If the measured "max_concurrent_rate" is lower than the data_sent$_{STA}$, the controlled environment is reset by modifying the modulation rate and/or packet length to generate the at least two independent multicast packet flows and all the previous steps are repeated for validation of the "sense_accuracy" estimated value.

Another aspect of the present invention is to provide a system for measuring quality of networking nodes, which implements the method described above, comprising at least two test nodes connected to a node to be submitted for characterization by means of the quality metrics defined before. All the nodes are isolated from any external interference, fall within carrier sensing range of the rest and are configured to transmit and receive data packets using a distributed medium access protocol relying on carrier sensing. Wireless nodes can be used in this system that constitutes the testing controlled environment where the steps of the above described method are executed.

The main advantages and innovations of the proposed invention become apparent in the description and are summarized as follows:
  1. It assures interoperability between nodes, taking into account that different values of "sense_accuracy" can lead to an unfair share of the channel between different network nodes.
  2. It introduces a new potential benchmark test that helps manufacturers assess the quality of the networking product released.
  3. The automatic method here described and when it is integrated in a convenient testing platform can help a service provider perform a systematic assessment of the equipment acquired for a more robust network deployment in terms of interference and frequency reuse.

4. The described testing method and system, once applied, permits the development of more realistic network models to be used in network planning tasks.
5. Applying this method, and when the equipment tested allows a reconfiguration of the sensing architecture, allows calibrating the equipment to perform as desired in a given environment.

BRIEF DESCRIPTION OF THE DRAWINGS

To complete the description and in order to provide for a better understanding of the invention, a set of drawings is provided. Said drawings form an integral part of the description and illustrate a preferred embodiment of the invention, which should not be interpreted as restricting the scope of the invention, but just as an example of how the invention can be embodied. The drawings comprise the following figures.

DETAILED DESCRIPTION OF THE INVENTION

Figure 1:
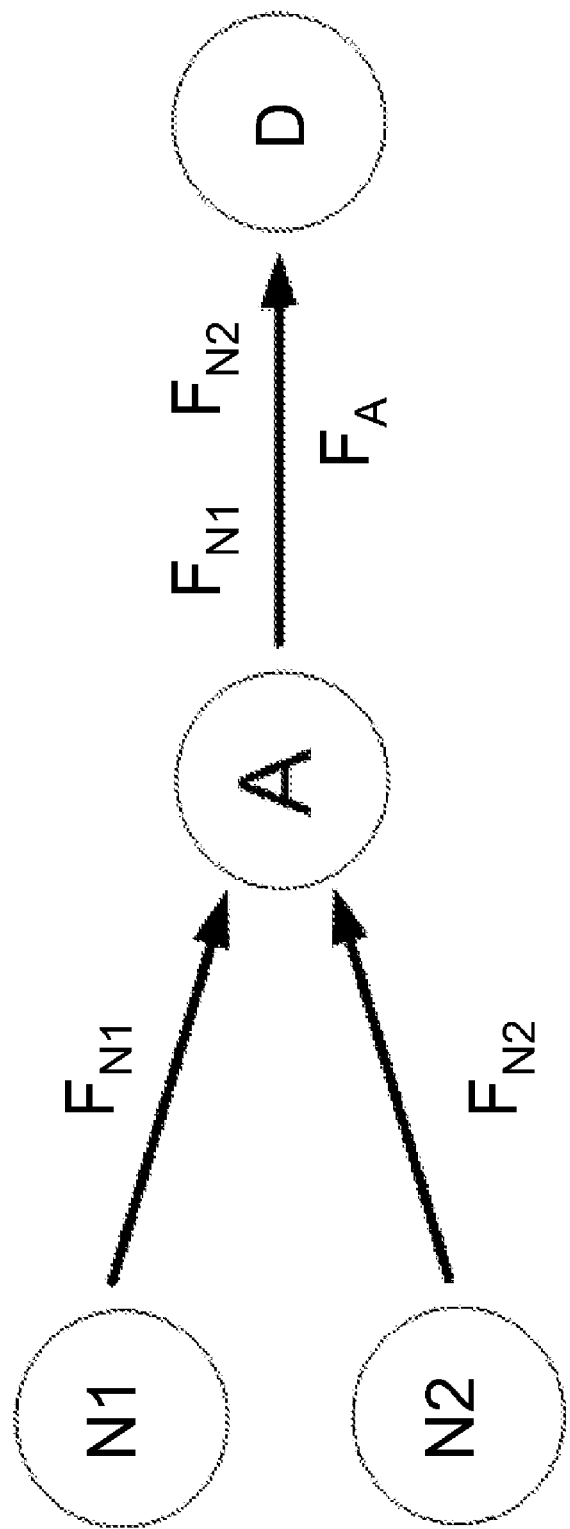
FIG. 1 is a schematic representation of a wireless multi-hop network scenario that is typical in the state of the art.
Figure 2:
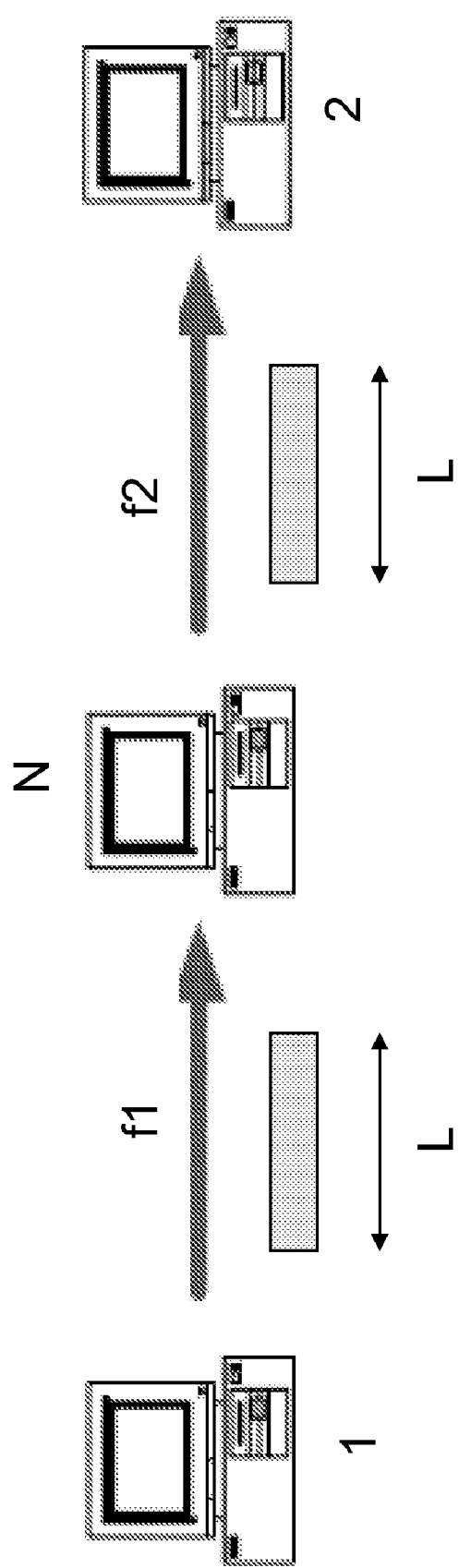
FIG. 2 is a schematic representation of a testing system for measuring quality metrics of a network node, in accordance with a preferred embodiment of the invention.

Here below a practical implementation of the invention is described, in the light of the system shown by FIG. 2, illustrating a preferred testing environment setup to conduct the methodology for measuring the two parameters before defined: "max_concurrent_rate" and "sense_accuracy" that constitute quality metrics of a node (N), which may be for example a wireless node.

This testing environment comprises two test nodes (1, 2), being a sender node (1) and a receiver node (2), connected to the node (N) under test and placed close to each other so that all of them fall within carrier sensing range of the rest and receivers fall within transmission range of their corresponding transmitters. All the nodes (1, 2, N) of the testing environment are isolated from any external interference and configured to use the same fixed rate.

The node under test (N) is set to receive a first flow (f1) from the sender node (1) and is also set to generate, at the same time, a second flow (f2) destined to the receiver node (2). Both test flows (f1, f2) are identical CBR traffic flows, which have a same packet length (L) and generation rate, and are started at the same time so that they concurrently share the wireless medium. Both flows (f1, f2) are sent to multicast link layer addresses. Using multicast flows assures that no ARQ mechanisms are activated at the link layer.

Since all the nodes (1, 2, N) in the setting are configured to transmit data at the same speed and using the same modulation, the protocol they use to communicate is fair, assuring equal probability to transmit for all nodes, and when the CBR flows generate enough data traffic to saturate the network, that is, when wireless nodes are backlogged at all times, this testing setup constitutes a highly controlled environment where an accurate value of $T_{expected\_stall}$ can be determined getting the value of $T_{active}$.

According to the specifications of the IEEE 802.11 MAC protocol, it is known that the respective values of $T_{active}$ and $T_{idle}$ can be computed as:

$$T_{active}=(L/\text{phy\_rate})+T_{preamble}+T_{phy}$$

$$T_{idle}=T_{DIFS}+CW \cdot T_{slot}$$

where $T_{DIFS}$ accounts for the duration of the DIFS period, CW is the mean value obtained for the random backoff numbers, $T_{slot}$ is the duration of a time slot, L is the length expressed in bits of the packet including MAC headers, phy_rate is the modulation at which the node has been configured to send data expressed in bits per second, $T_{preamble}$ is the duration of the physical layer preamble and $T_{phy}$ is the duration of the physical layer header. All these values can be found in the IEEE 802.11 specifications and its extensions.

Note here that the value of $T_{active}$, and, thus, the value of $T_{expected\_stall}$ depends on the speed at which data is transmitted and the length of the data packets which are transmitted: The more the length of the packets and the lower the transmission speed the higher the value of $T_{active}$.

More specifically, an example of experimental implementation of the testing environment, which shows the actual performance of the methodology for quality characterization of a practical wireless node, is proposed as follows:

A wireless node under test can be built up using a desktop computer (a Pentium IV PC with a 3 GHz processor, 512 MB of RAM memory and running Linux OS, with kernel 2.4.26) that carries a WLAN PCI device (a Z-COM ZDC XI-626 that incorporates an Intersil Prism chipset). The two test nodes have the same design. In order to isolate these three nodes from external interferences and in order to assure that they are within carrier sensing range of each other, all WLAN radios can be connected using coaxial cables and splitters.

The tool used to generate the CBR testing flows can be the MGEN: the Multi-GENerator toolset. Packets sent for each one of the test flows are counted at the driver level in order to assure that only packets that have actually been "put on the air" are counted. On the other side, packets received are counted using the MGEN application itself at the receiving side. Since there are no retransmissions, using Ethereal or kernel counters can lead to similar results.

For this example of experimental testbed, the CBR test flows are generated with packets of a fixed length of 1500 bytes and with an increasing packet rate. Wireless devices are configured to work either at 2 Mbps or 11 Mbps physical rate. Additionally, CBR flows are sent using multicast MAC addresses in order to avoid MAC layer acknowledgements and to ease the computation of the expected value of $T_{expected\_stall}$.

In order to compute the values of $T_{expected\_stall}$, $T_{active}$ and $T_{idle}$, there follows the respective values of $T_{preamble}$, $T_{phy}$, $T_{DIFS}$, $T_{slot}$ and CW, drawn from the IEEE 802.11 specifications, being the Intersil Prism cards based on the 802.11b extension of the standard:

TABLE 1

| | |
|---|---|
| $T_{preamble}$ | 144 microseconds |
| $T_{phy}$ | 48 microseconds |
| $T_{DIFS}$ | 50 microseconds |
| $T_{slot}$ | 20 microseconds |
| CW | 31 |

Figure 3:
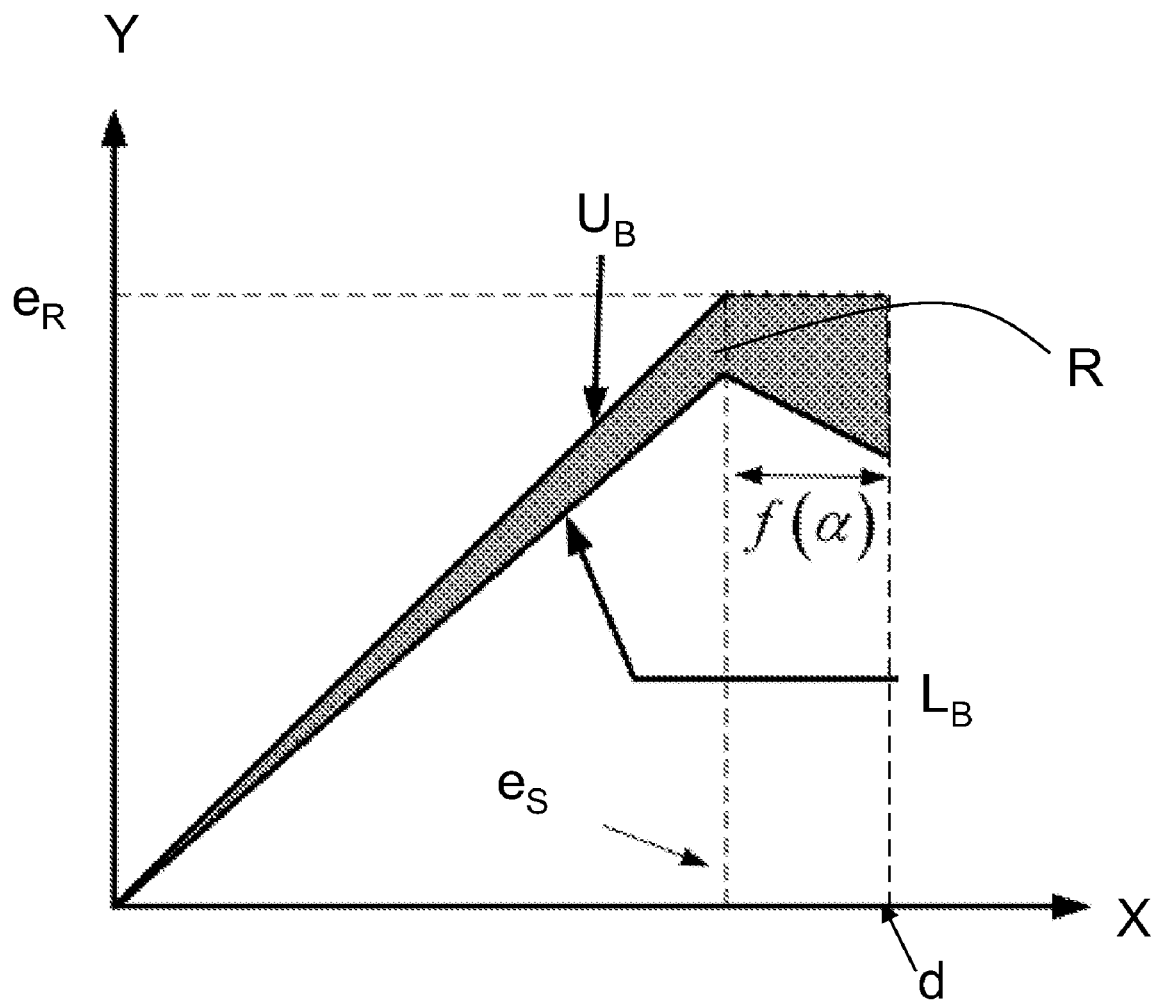
FIG. 3 shows a graphical representation of the sending and receiving rates (horizontal and vertical axis respectively of the Cartesian coordinate system) at the node under test in the system illustrated in the previous figure, also showing the measurements taken for the testing method.

FIG. 3 shows typical shapes of a so-called validation curve, which results for a given value of the data_sent$_{STA}$ defined according to equation 1 and a determined value of the "sense_accuracy" parameter using the testing setup proposed and when CBR traffic flows at different packet rates are generated. The validation curve represents the outcome to be expected when plotting the actual packet rate received from the first flow (f1) and sent from the second flow (f2) by the node under test (N). This validation curve can be represented in bits per second or packets per second depending on the factor that limits the maximum workload that the node under test (N) is able to support. There are an upper bound ($U_B$) and a lower bound ($L_B$) for the possible validation curves that determine a region (R), depicted as a shadowed region in FIG. 3, here called the validation region (R) as all the measured values for the node (N) to be characterized should fall within this region, as explained more ahead.

Figure 4A:
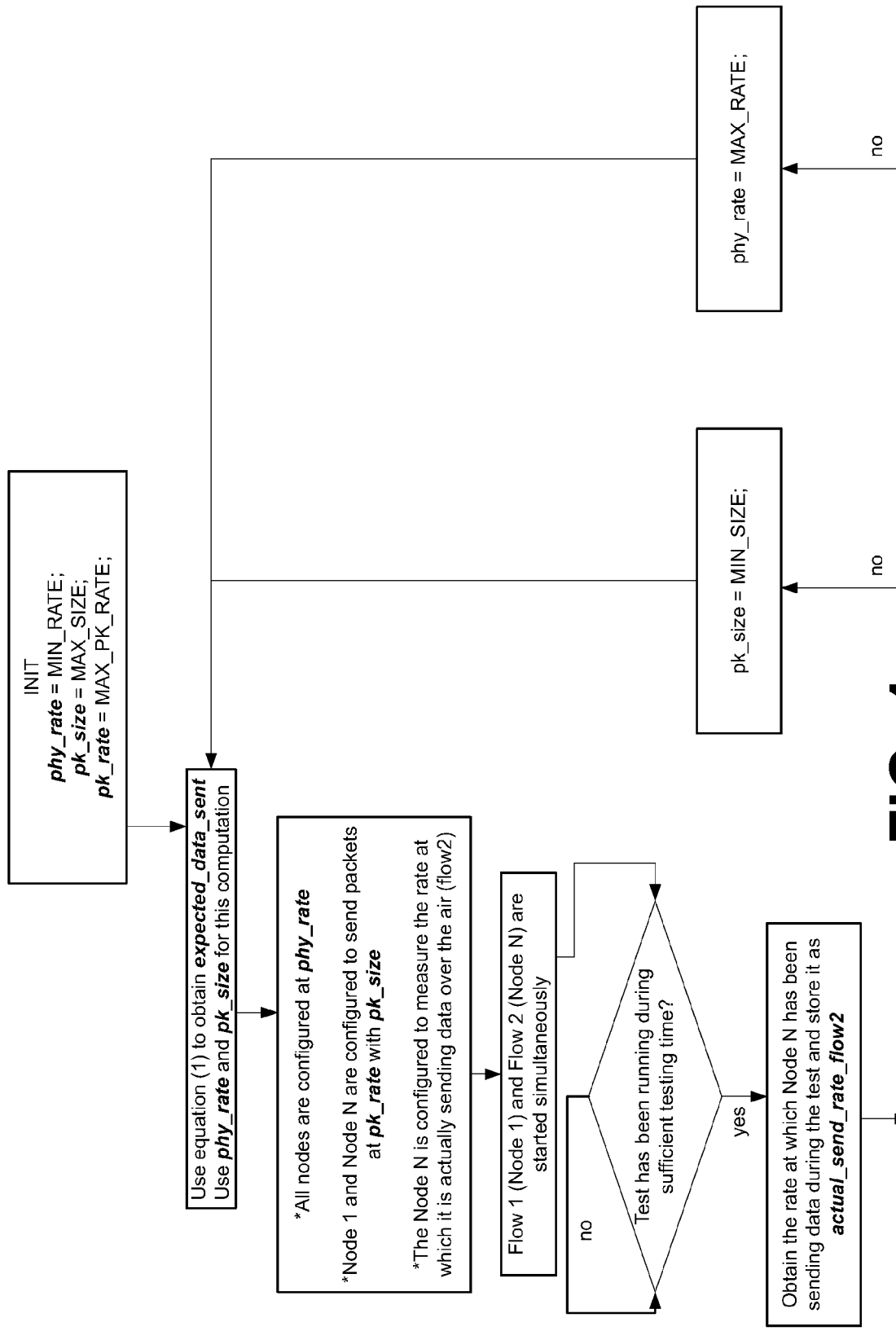
FIG. 4 shows a workflow (split in three consecutive parts corresponding to FIGS. 4a, 4b and 4c) of the testing method, specifying the sequence of actions that need to be performed for measuring quality metrics of a network node, in accordance with an embodiment of the invention.
Figure 4B:
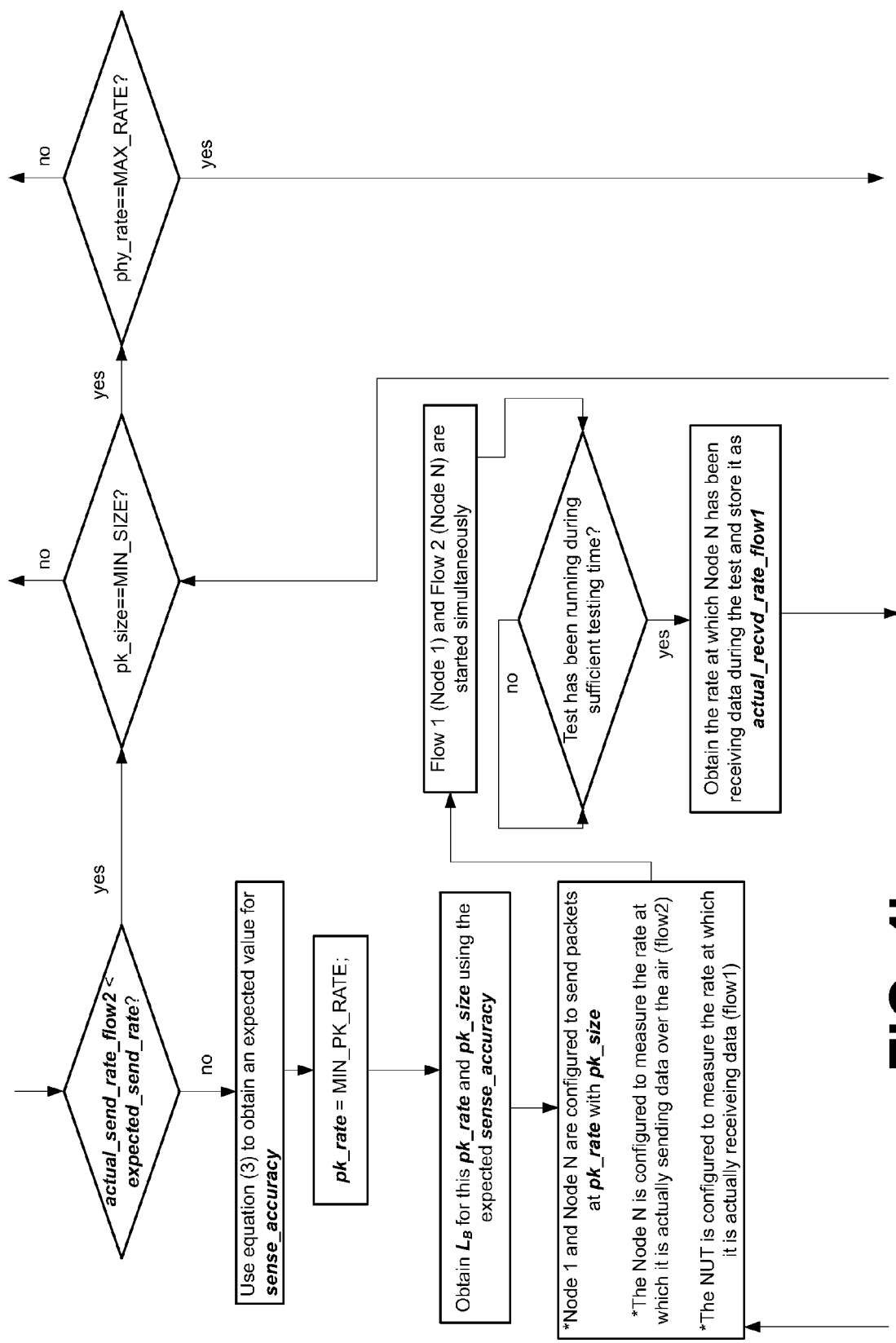
Figure 4C:
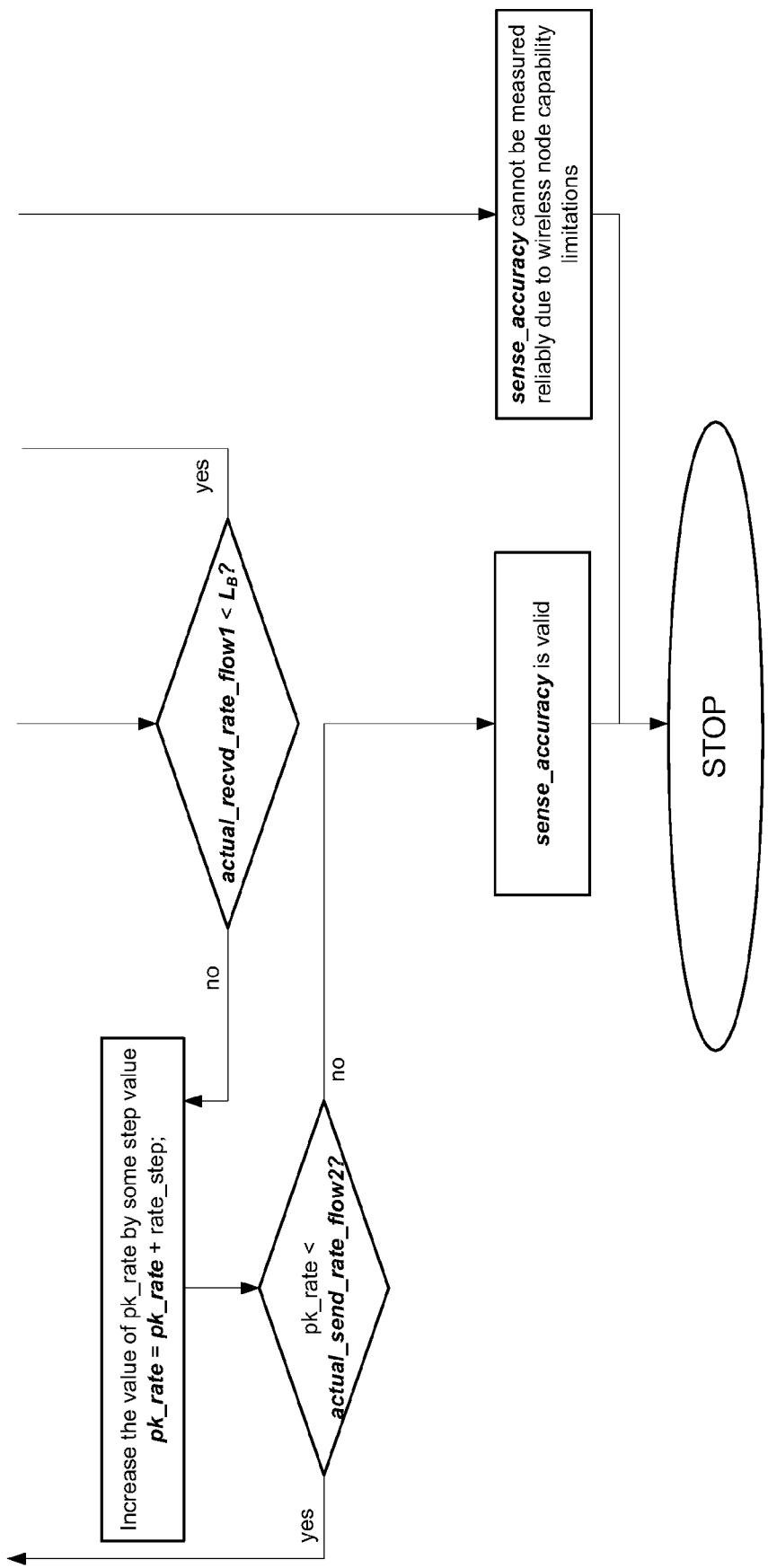

FIG. 4 shows a workflow of an automatic testing procedure to determine and validate the value of the "sense_accuracy" parameter for the node under test (N), which accounts for carrier sensing accuracy (α). When appropriate, in order to reconfigure the testing setup to obtain a valid value of sense_accuracy (α), this procedure can also determine the value of "max_concurrent_rate", that is, the maximum data rate (β) sent and received concurrently by the node (N) at the saturation point in this testing environment. The automatic procedure comprises the following steps:

Step 1) Once the testing environment is setup, the nodes (1, 2, N) are configured to use lower possible modulation rate (phy_rate) and handle the packets with a length (pk_size) as higher as possible.

Step 2) Using equation 1, an expected value for the data rate (expected_data_sent) that the node under test (N) achieves at the stage defined in step 1 is obtained. An accurate node is able to send as many packets as it receives up until maximum channel utilization, so the expected data rate value for the sent packets ($e_S$) is the same as the expected data rate value for the received packets ($e_R$) and equal to said maximum channel utilization. Besides, as both CBR test flows (f1, f2) have identical packet rates and packet sizes, the accurate node would follow the upper bound ($U_B$) in FIG. 3.

Step 3) The sender node (1) and the node under test (N) are configured to send packets at the maximum possible rate the and the two test flows (f1, f2) are started simultaneously.

Step 4) After a predetermined testing time, the average packet rate sent by the node under test (N), from the second flow (f2), is measured and used to compute an estimation of sense_accuracy (α).

Step 5) To validate the value of the estimated sense_accuracy (α), the two test flows (f1, f2) are reconfigured at a low packet rate, they are run for a testing time period and, after said testing time, the data rate sent and received by the node under test (N) are measured. If the measured data rates fall outside either the upper bound ($U_B$) or lower bound ($L_B$), i.e., the measures fall outside the validation region (R), the estimated sense_accuracy (α) value is determined as not valid. Otherwise, the two test flows (f1, f2) are configured at a higher packet rate and the process is repeated. This step is repeated until the value measured in step 4) is reached or until the estimated sense_accuracy (α) is determined to be not valid.

Step 6) If the value of sense_accuracy (α) is valid, the process concludes. Otherwise the process follows to step 7).

Step 7) If this step is executed, it means that the value of sense_accuracy (α) is not valid and that the node under test (N) is limited in the amount of memory that can handle per time. Then, the length of the packets is reduced to the minimum as possible.

Step 8) Steps 2) to 5) are repeated using the new value for the packet length. If sense_accuracy (α) is valid, then the process concludes. Otherwise the process follows to step 9).

Step 9) If this step is executed, it means that the value of sense_accuracy (α) is not valid. The modulation rate used by the nodes is increased to the maximum.

Step 10) Steps 2) to 5) are repeated using the new value for the modulation rate. If the value of sense_accuracy (α) is valid, the process concludes. Otherwise the process follows to step 11)

Step 11) If this step is executed, it means that the value of sense_accuracy (α) is not valid. Also, this means that the node under test (N) is limited both in number of packets per second and memory that can handle per time and, then, the process fails to provide a reliable measure of sense_accuracy. If this step is reached, it also indicates that the node under test (N) might be not appropriately designed as it cannot sustain typical workloads that it can be required to.

As an initial testing scenario setup at step 1, the test nodes (1, 2) are assumed to have a value of the sense_accuracy equal to 1, as they are calibrated to perform as expected from the node under test (N). In the case that the node under test (N) is a wireless node, the test nodes (1, 2) can be either real wireless nodes too or any other apparatus capable of communicating with the node being tested (N) using the same protocol. In any case, all nodes (1, 2, N) are configured to use the same physical layer modulation to transmit. In particular, the sender node (1) and the node under test (N) are set to send packets of the same fixed length (L). In case that the value of max_concurrent_rate (β) is previously known for the node being tested (N), an appropriate modulation rate and size of packets are selected so that the resulting value of equation 1 cab be lower than said known value. In any other case, any arbitrary initial value for max_concurrent_rate (β) can be chosen. Following the methodology, it can be detected when the value of sense_accuracy (α) is affected and then correct the chosen modulation and the size of packets.

The sender node (1) and the node under test (N) are requested simultaneously for sending two CBR flows (f1, f2) to two link layer multicast addresses. The node under test (N) is configured to capture packets send by sender node (1) from the first flow (f1) and the receiver node (2) to capture packets from the second flow (f2) sent by this node under test (N). The sender node (1) and the node under test (N) generate their corresponding flows (f1, f2) at exactly the same packet rate, which is chosen to be high enough to saturate the testing setup. If the saturation rate of the testing setup is not known, the packet generation rate is increased until neither the sender node (1) nor the node under test (N) are able to send packets at a higher rate.

Having provided that both flows (f1, f2) in the testing setup are generated identical and the IEEE 802.11 access procedure is fair with these two flows (f1, f2), the data rate sent and received by an accurate node, i.e., the node characterized by α=1, would be identical up to the saturation point. In FIG. 3, as the validation curve plots in the Cartesian coordinate system the received bitrate from the first flow (f1), in a vertical axis (Y), versus the sent bitrate in the second flow (f2), in a horizontal axis (X), the upper bound ($U_B$) of the validation curves can be easily found: it takes the same value on the two axis (X, Y), that is, it is the identity function or map, representing that no losses are experienced on the received packets until the testing setup reaches maximum utilization. From this point, despite the node (N) might be generating the second flow (f2) at a higher data rate than expected, up to data_sent$_{STA}$ (d), it cannot receive from the first flow (f1) more than what the testing setup can support in saturation. On the other side, the lower bound ($L_B$) of the validation curves represents a worst case scenario where the node (N) is not correctly detecting that the medium is being used it is actually loosing data all the time. In this worst case scenario, each packet sent in the first flow (f1) has then a probability equal to 1−α of not being received by this node (N). This is even worse after the saturation limit of expected data sent ($e_S$) is surpassed. In such a case, each extra packet sent results in a collision causing even more losses in the reception of first flow (f1) at the node (N). Thus, the lower bound ($L_B$) is a function of sense_accuracy (α) and can be defined as:

$$L_B = f(\alpha) = \begin{cases} \alpha - r, & \text{if } r \leq e_S. \\ \alpha - e_S - (r - e_S), & \text{if } r > e_S. \end{cases}$$

wherein r is the packet rate received from the first flow (f1) by the node (N)

When the node (N) is not accurate, i.e. α<1, it continues increasing the rate of data sent up until it reaches saturation when sending at a data rate equal to data_sent$_{STA}$ (d). As explained before, this value of data_sent$_{STA}$ (d) is used to get the estimation of sense_accuracy (α), calculating this sense_accuracy (α) value applying the equation 3, which needs to be validated. In such a case when α<1, unexpected collisions may appear during the whole measurement procedure.

The measurement procedure is based on continuously gathering values for the actual data rate sent, in the second flow (f2) and data rate correctly received from the first flow (f1) at the node under test (N). Flows (f1, f2) start being sent at a very low packet rate, which is progressively increased until a maximum value for the data sending rate of second flow (f2) is reached, that is, the saturation point is reached in the testing scenario. Measuring the data rate sent by the node under test (N) at this point provides an estimation of the value of data_sent$_{STA}$ (d) to be used in equation 3 for estimating sense_accuracy (α). Such value still has to be validated by detecting the maximum data rate (β) sent and received concurrently by the node (N) at the saturation point, which is the parameter defined here as the max_concurrent_rate (β).

The presence of max_concurrent_rate (β) can be detected whenever the resulting measured curve falls outside the expected one. The value of max_concurrent_rate (β) is determined finding the last point at which the measured curve falls inside the expected one. In order to assure that the estimation of sense_accuracy (α) is valid, the actual values measured for the node (N) being characterized should fall within the region (R) limited by the upper and lower bounds ($U_B$, $L_B$). This is the case when applying this measurement methodology to a node under test (N) that does not present a value of max_concurrent_rate (β) lower than the value of data_sent$_{STA}$ (d). On the contrary, when max_concurrent_rate (β) is lower than data_sent$_{STA}$ (d) and so can invalidate the value of sense_accuracy (α), the point at which measured values cut either the upper or the lower bound is precisely the value of max_concurrent_rate (β) characterizing this node (N).

Figure 5:
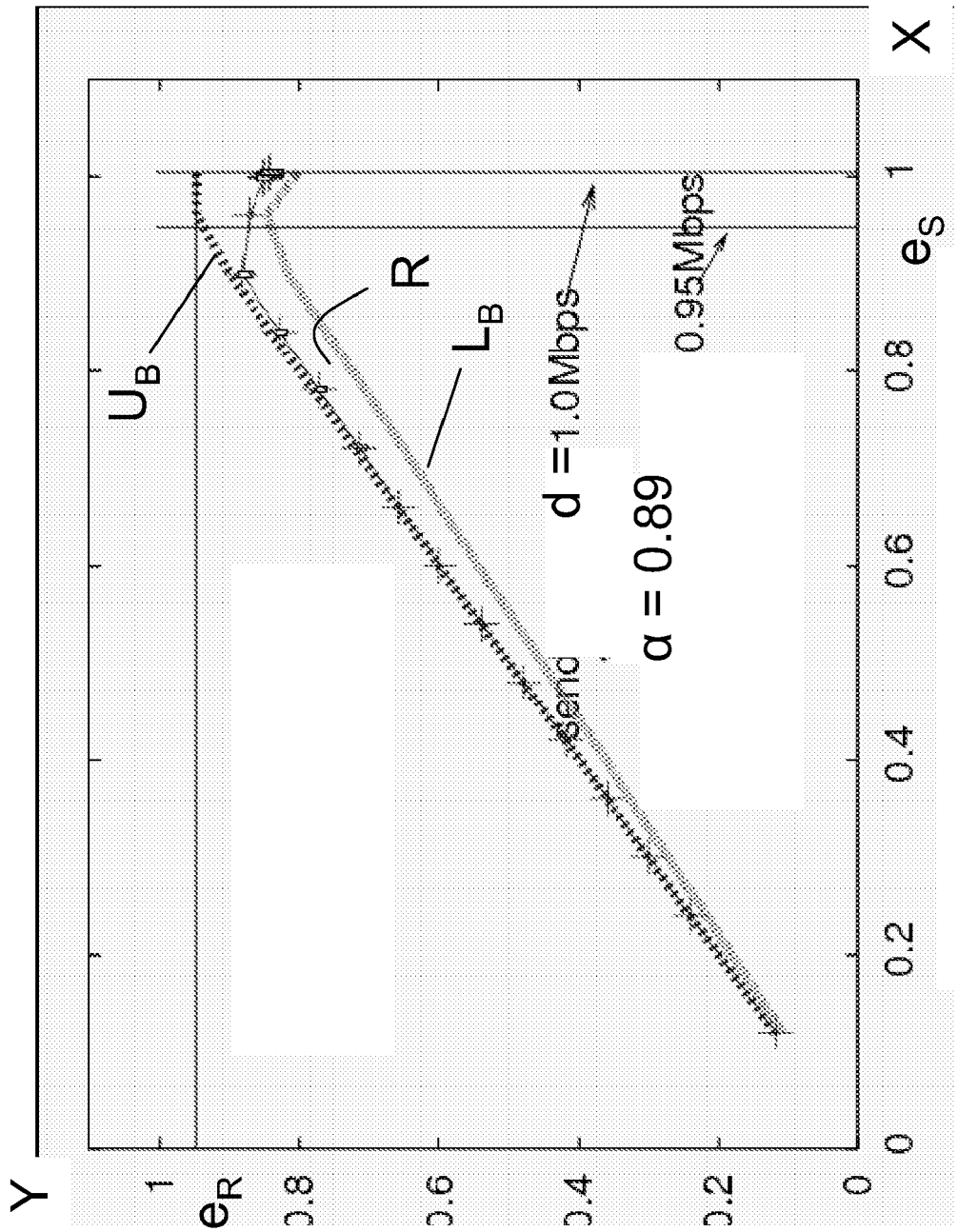
FIG. 5 shows a graphical representation of the sending and receiving rates (horizontal and vertical axis respectively) measured for a wireless node working in the system illustrated in FIG. 3 with a physical rate of 2 Mbps, according to the testing method, which leads to a value of sense accuracy correctly validated.
Figure 6:
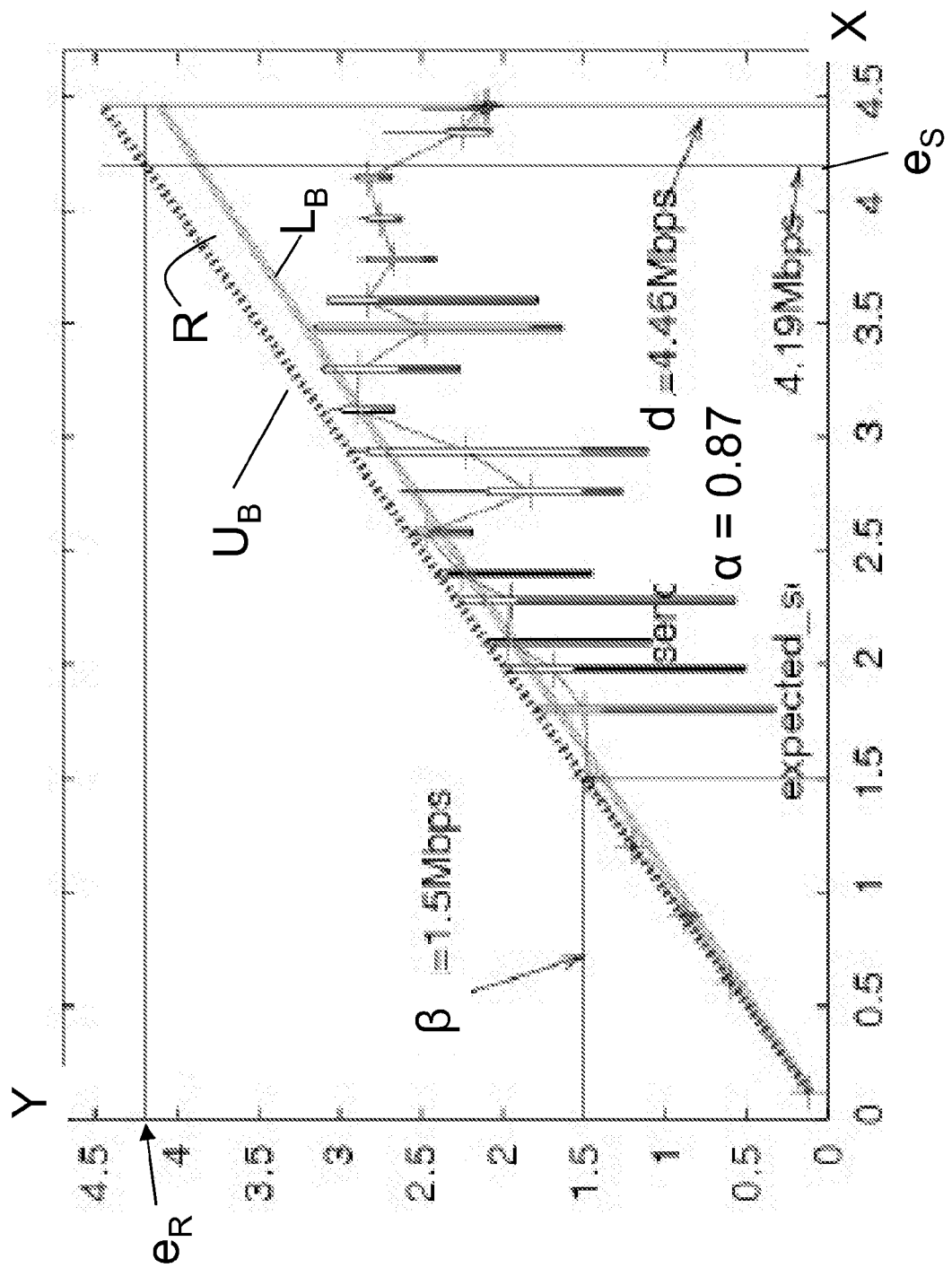
FIG. 6 shows a graphical representation of the sending and receiving rates (horizontal and vertical axis respectively) measured for the previous wireless node working in the system illustrated in FIG. 3 but with a physical rate of 11 Mbps, according to the testing method, which leads to a value of sense accuracy that cannot be correctly validated.

Returning to the specific example of experimental testing environment previously described, this measurement methodology has been applied to the Intersil Prism based wireless node built as explained before, in order to empirically obtain the accurate values of sense_accuracy (α) and max_concurrent_rate (β). FIGS. 5 and 6 present the measured values and their corresponding box plots obtained during the experiment using the two identical CBR test flows with packets of 1500 bytes which bring the values of Table 1.

FIG. 5 shows the characterization graphic, in continuous line, of the wireless node under test (N) when it is configured at 2 Mbps, plotted between the validation curves corresponding to the upper and lower bounds ($U_B$, $L_B$). In the vertical axis (Y), the throughput received at the node (N) is represented in Mbps versus the throughput in the horizontal axis (X), also in Mbps, sent by this node (N), just as proposed in FIG. 3. The value obtained for the sense_accuracy (α) is α=0.89, which is one of the quality parameters characterizing the wireless node (N) configured at 2 Mbps. The maximum data rate reached for the second flow (f2) exceeds the one expected ($e_S$), being in this case $e_S=e_R=0.95$ Mbps, and the value of data_sent$_{STA}$ (d) is d=1 Mbps. With these conditions, all the measured values are confined within the validation region (R) between the upper and lower bounds ($U_B$, $L_B$). Therefore this value of the sense_accuracy (α) is valid: α=0.89 is not distorted by the quality parameter referring to the value of max_concurrent_rate (β).

FIG. 6 shows the characterization plot of the same node (N) but this time when it is configured at 11 Mbps. A value for sense_accuracy (α) is obtained in the case: α=0.87. However, it can be seen that when the data rate sent by this wireless node (N) exceeds 1.5 Mbps, the experimental results present a highly unstable behaviour and the measured values fall outside the expected bounds, crossing the lower bound ($L_B$). Then, the quality parameter max_concurrent_rate (β) gets a value β=1.5 Mbps which invalidates any estimated value of sense_accuracy (α). Note that when the Intersil Prism card is working at 1.5 Mbps, it is actually handling 3 Mbps, as both incoming and outgoing traffics have to be accounted. Finally, it is worth noticing here that the behaviour of the curve above the max_concurrent_rate (β) indicates that this node (N) gives priority to outgoing traffic rather than incoming traffic. Empirical observations show that this is a good assumption because in practice the node (N) drops incoming traffic while not reducing outgoing rates.

In this text, the term "comprises" and its derivations (such as "comprising", etc.) should not be understood in an excluding sense, that is, these terms should not be interpreted as excluding the possibility that what is described and defined may include further elements, steps, etc.

The invention is obviously not limited to the specific embodiments described herein, but also encompasses any variations that may be considered by any person skilled in the art (for example, as regards the choice of components, configuration, etc.), within the general scope of the invention as defined in the appended claims.

Some preferred embodiments of the invention are described in the dependent claims which are included next.

The invention claimed is:

1. A method for measuring a quality of networking nodes, wherein a node (N) transmits and receives data packets of a packet length (L) using a distributed medium access protocol relying on detecting transmissions from other nodes by carrier sensing, the node (N) is at one of three possible states: an idle state ($T_{idle}$), an active state($T_{active}$) and a stall state ($T_{expected\_stall}$), the method comprising the steps of:
- (a) setting a controlled environment where at least two independent multicast packet flows, a first flow (f1) and a second flow (f2), are generated using identical modulation rate and the packet length (L), and where the node (N) receives the first flow (f1) and sends the second flow (f2) at a packet rate;
- (b) determining, in the controlled environment, values of a mean time that the node (N) remains in the idle state ($T_{idle}$), a mean time that the node (N) remains in the active state ($T_{active}$) and a mean time that the node (N) is expected to remain in the stall state ($T_{expected\_stall}$);
- (c) increasing periodically the packet rate until the controlled environment reaches a saturation point;
- (d) measuring the data packets sent by the node (N) at the saturation point in the controlled environment resulting a data rate (dr);
- (e) measuring a maximum data rate ($\beta$) sent and received concurrently by the node (N) at the saturation point in the controlled environment; and
- (f) measuring a carrier sensing accuracy ($\alpha$) of the node (N) for the modulation rate and the packet length (L).

2. The method according to claim 1, wherein step (f) comprises
- (g) calculating an estimated value of "the carrier sensing accuracy" ($\alpha$) of the node (N) according to $$\alpha = \frac{\left(\frac{L}{\beta}\right) - Tactive - Tidle}{Texpected\_stall}$$

- (h) validating the estimated value of "the carrier sensing accuracy" ($\alpha$) by detecting the maximum data rate ($\alpha$) present in step (e).

3. The method according to claim 2,
wherein step (h) comprises
- (i) comparing between the maximum data rate ($\beta$) and the data rate (dr) sent by the node (N) at the saturation point.

4. The method according to claim 3, wherein, if step (i) results in "the maximum data rate" ($\beta$) being lower than the data rate (dr), step (h) further comprises
- resetting the controlled environment by modifying the modulation rate or the packet length (L) to generate the at least two independent multicast packet flows;
- repeating steps (a) through (f) and steps (g) through (i).

5. The method according to claim 1, wherein step (h) comprises
- (j) plotting in a Cartesian coordinate system
- a measurement function generated by measuring the packet rate sent for the second flow (f2) by the node (N) versus the packet rate received from the first flow (f1) by the node (N);
- an upper bound ($U_B$) which is the identity function equal to the packet rate of the first flow (f1) and the second flow (f2) until a maximum channel utilization ($e_s$) point is reached in the controlled environment and, when surpassing the maximum channel utilization point, the upper bound ($U_B$) is a constant function equal to the packet rate of the second flow (f2) at said maximum channel utilization ($e_s$) point; and
- a lower bound ($L_B$) which is a function of carrier sensing accuracy ($\alpha$) defined as $$L_B = f(\alpha) = \begin{cases} \alpha - r, & \text{if } r \leq e_S. \\ \alpha - e_S - (r - e_S), & \text{if } r > e_S. \end{cases}$$

wherein r is the packet rate received from the first flow (f1) by the node (N).

6. The method according to claim 5, further comprising the step of
- (k) determining that the estimated value of "the carrier sensing accuracy" ($\alpha$) is valid if all the points from the measurement function fall inside a validation region (R) limited by the upper bound ($U_B$) and the lower bound ($L_B$).

7. The Method according to claim 5, wherein, if any point from the measurement function falls outside a validation region (R) limited by the upper bound ($U_B$) and lower bound ($L_B$), step (k) further comprises
- resetting the controlled environment by modifying the modulation rate or the packet length (L) to generate the at least two independent multicast packet flows.

8. The method according to claim 1, further comprising
- determining the values of the mean time that the node remains in the idle state ($T_{idle}$) and the mean time that the node remains in the active state ($T_{active}$) by the distributed medium access protocol.

9. The method according to claim 8, further comprising
- setting the value of the mean time that the node (N) is expected to remain in the stall state ($T_{expected\_stall}$) to be equal to the value of the mean time that the node remains in the active state ($T_{active}$).

10. The method according to claim 1, wherein the distributed medium access protocol is "an IEEE"802.11 WLAN protocol.

* * * * *